(12) United States Patent
Poling, Jr.

(10) Patent No.: US 12,336,528 B2
(45) Date of Patent: Jun. 24, 2025

(54) TURKEY CALL APPARATUS

(71) Applicant: John Henry Poling, Jr., Moatsville, WV (US)

(72) Inventor: John Henry Poling, Jr., Moatsville, WV (US)

(*) Notice: Subject to any disclaimer, the term of this patent is extended or adjusted under 35 U.S.C. 154(b) by 267 days.

(21) Appl. No.: 18/196,143

(22) Filed: May 11, 2023

(65) Prior Publication Data

US 2024/0032527 A1 Feb. 1, 2024

Related U.S. Application Data

(60) Provisional application No. 63/393,331, filed on Jul. 29, 2022.

(51) Int. Cl.
*A63H 5/00* (2006.01)
*A01M 31/00* (2006.01)

(52) U.S. Cl.
CPC ............ *A01M 31/004* (2013.01); *A63H 5/00* (2013.01)

(58) Field of Classification Search
CPC ........ A01M 31/004; A63H 5/00; G10D 13/02
See application file for complete search history.

(56) References Cited

U.S. PATENT DOCUMENTS

| 2,158,445 | A | * | 5/1939 | Weiss | A63H 5/00 446/416 |
| 3,902,272 | A | * | 9/1975 | Molenaar | A63H 5/00 446/415 |
| 4,586,912 | A | * | 5/1986 | Adams | G10K 9/10 446/397 |
| 5,562,521 | A | * | 10/1996 | Butler | A01M 31/004 446/397 |
| 6,872,118 | B1 | | 3/2005 | Bishop | |
| 7,785,169 | B2 | | 8/2010 | Moss | |
| 10,897,888 | B1 | | 1/2021 | Walker | |
| 2006/0040583 | A1 | * | 2/2006 | Thompson | A01M 31/004 446/418 |
| 2008/0280525 | A1 | * | 11/2008 | Carr | A01M 31/004 446/397 |
| 2016/0309700 | A1 | * | 10/2016 | Thomas | A01M 31/004 |

* cited by examiner

*Primary Examiner* — John A Ricci
(74) *Attorney, Agent, or Firm* — HSML P.C.

(57) ABSTRACT

A pot call includes a pot defining a chamber with an opening, a sound board, at least one spring; and a member defining a striking surface. The sound board is disposed within the chamber and mounted to the pot via the at least one spring. The member defining the striking surface is mounted to the pot such that the member obstructs the opening to the chamber. The pot call provides a more realistic turkey call sound than the prior art by providing improved resonance and volume.

9 Claims, 5 Drawing Sheets

TURKEY CALL APPARATUS

CROSS-REFERENCE TO RELATED APPLICATION

This application claims the benefit of U.S. Provisional Patent Application No. 63/393,331, filed Jul. 29, 2022, and which is hereby incorporated by reference in its entirety.

TECHNICAL FIELD

This invention relates to calls for game animals.

BACKGROUND

Turkey hunters frequently employ turkey calls to attract turkeys. The turkey calls attempt to imitate the vocalizations of a turkey. Prior art turkey calls have taken a variety of forms, including box calls, pot calls, diaphragm calls, etc. Pot calls include a striking surface that, when rubbed with a striker, produces a sound that simulates a wild turkey.

SUMMARY

A pot call includes a pot defining a chamber with an opening, a sound board, at least one spring; and a member defining a striking surface. The sound board is disposed within the chamber and mounted to the pot via the at least one spring. The member defining the striking surface is mounted to the pot such that the member obstructs the opening to the chamber.

The use of one or more springs to mount the sound board to the pot significantly improves the performance of the pot call provided herein compared to the prior art. More specifically, the springs allow the sound board to more freely vibrate, thereby improving the resonance. The springs also eliminate the presence of solid pedestals within the chamber to support the sound board, thus increasing the volume of air within the chamber and thereby improving sound volume. These improvements result in a more realistic simulation of a turkey vocalization, which in turn increases a hunter's chances of success.

A corresponding method of use is also provided herein.

The above features and advantages and other features and advantages of the present disclosure are readily apparent from the following detailed description of the best modes for carrying out the disclosure when taken in connection with the accompanying drawings.

DETAILED DESCRIPTION

Figure 1:
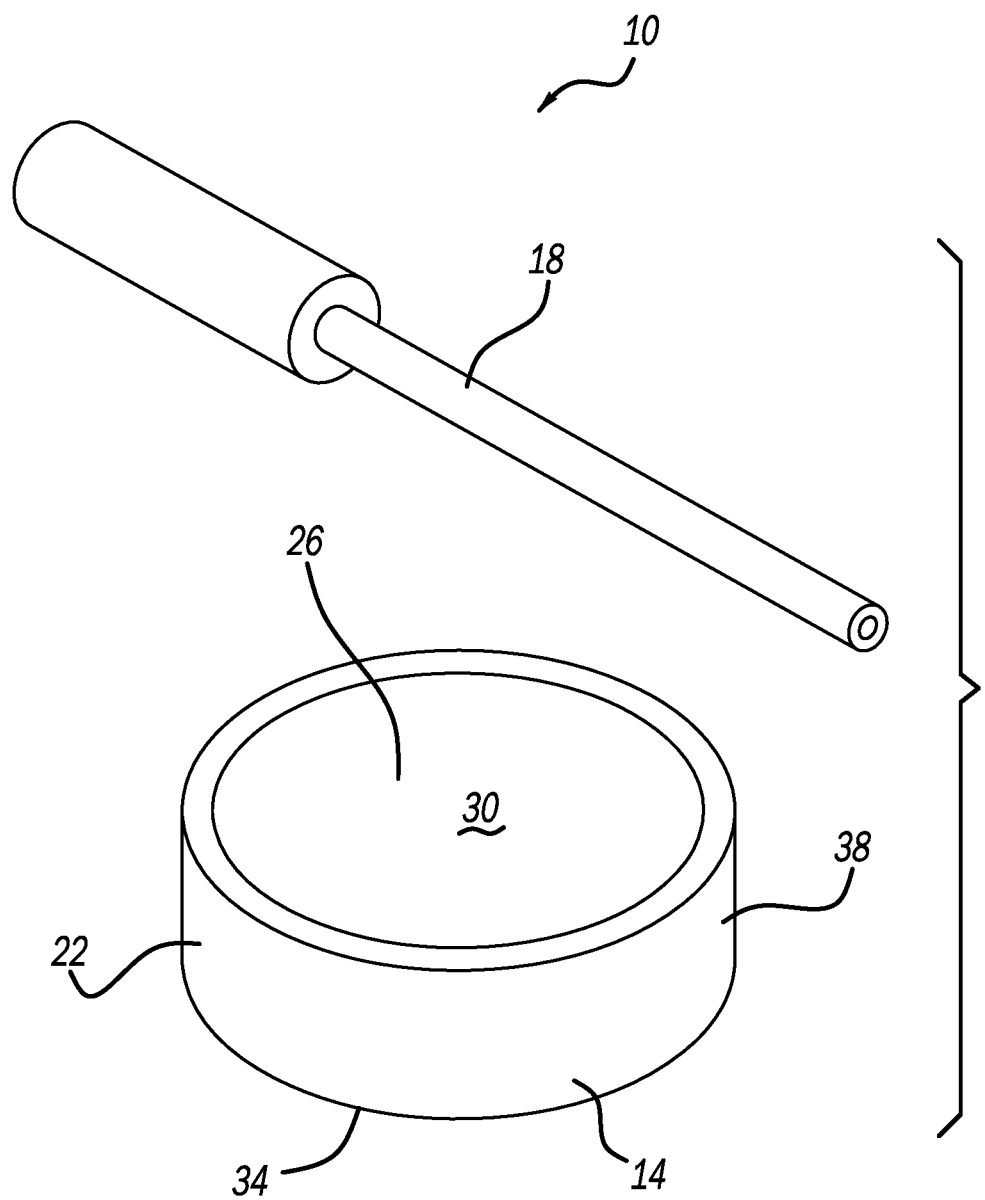
FIG. 1 is a schematic, perspective view of a pot call system including a pot call and a striker, the pot call including a pot, springs, a sound board, and a member.

Referring to FIG. 1, a pot call system 10 is schematically depicted. The pot call system 10 includes a pot call 14 and a striker 18. The pot call 14 includes a pot 22 and a member 26 defining a striking surface 30. As understood by those skilled in the art of pot calls, rubbing the striker 18 on the striking surface 30 produces a simulation of a turkey vocalization.

Figure 2:
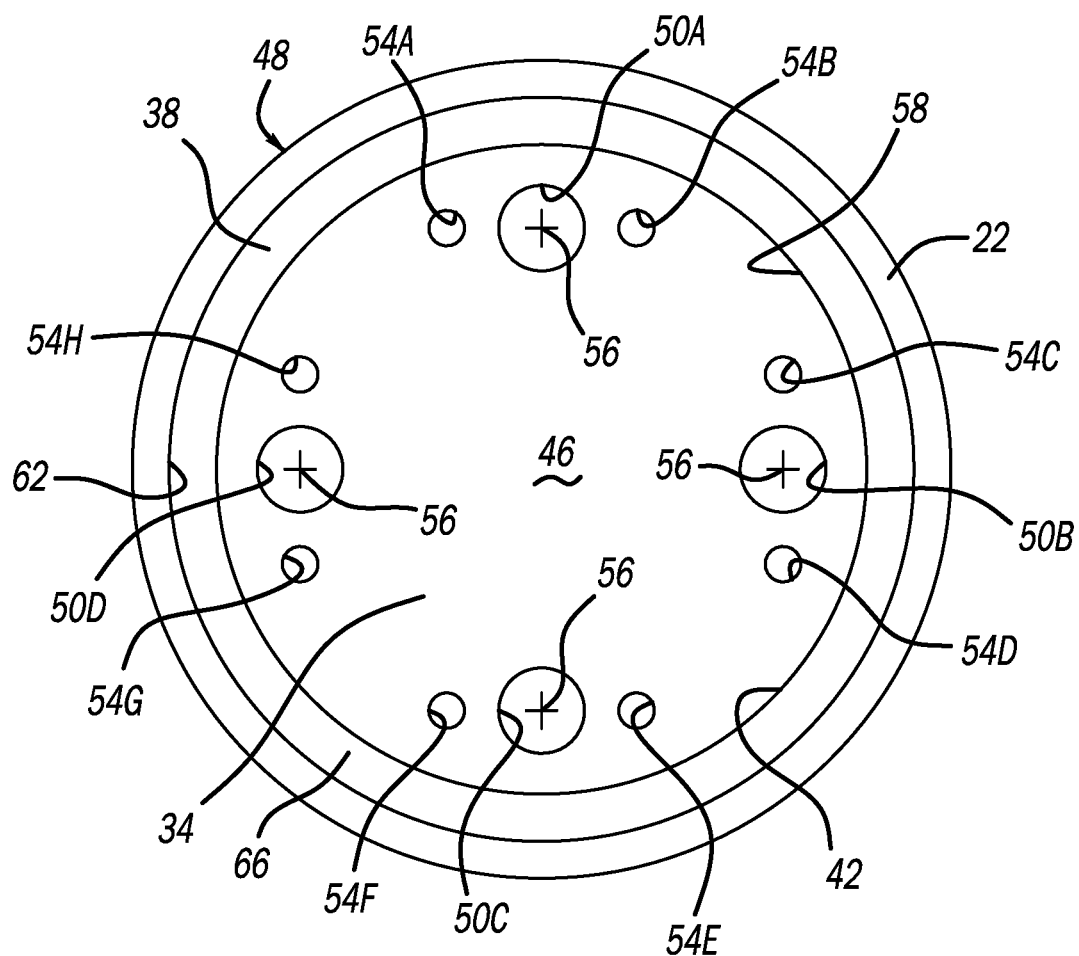
FIG. 2 is a schematic, top view of the pot of FIG. 1.
Figure 3:
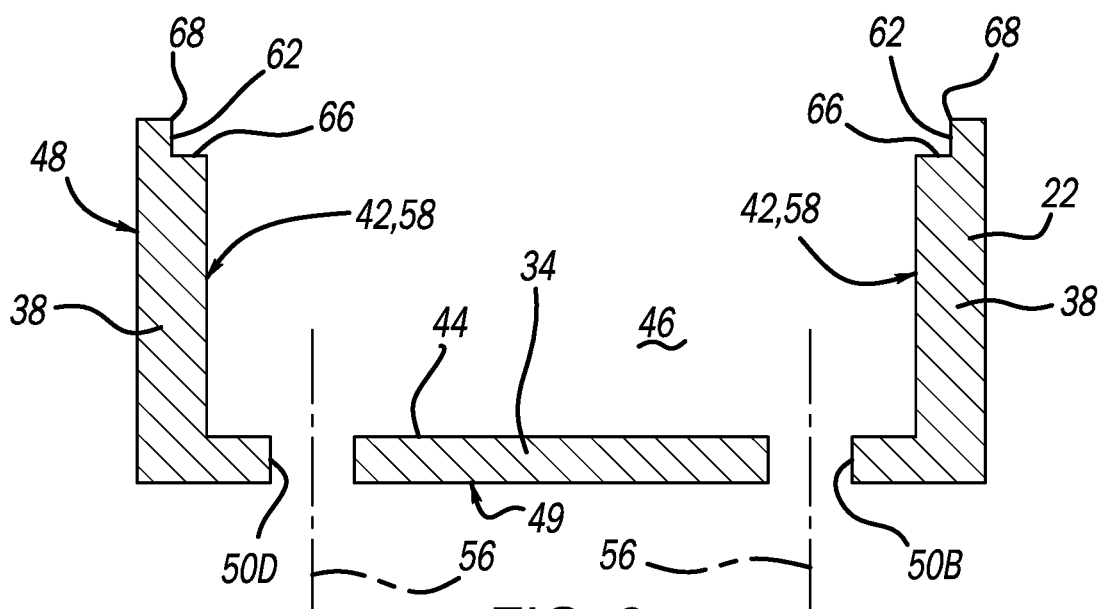
FIG. 3 is a schematic, cross-sectional, side view of the pot.

Referring to FIGS. 2 and 3, wherein like reference numbers refer to like components from FIG. 1, the pot 22 includes a base portion 34 and a sidewall portion 38. The sidewall portion 38 defines an inner surface 42, and the base portion 34 defines an inner surface 44. The inner surface 42 of the sidewall portion 38 and the inner surface 44 of the base portion 34 cooperate with each other to define a chamber 46. In the embodiment depicted, the inner surface 42 of the sidewall portion 38 is cylindrical and the inner surface 44 of the base portion 34 is circular; accordingly, the chamber 46 in the embodiment depicted is cylindrical. However, it should be noted that the pot 14 and the chamber 46 may have other geometries within the scope of the claimed invention.

The sidewall portion 38 in the embodiment depicted has a cylindrical outer surface 48, and the base portion 34 has a circular outer surface 49. The base portion 34 defines a plurality of holes that extend through the base portion 34, i.e., through through the inner surface 44 and the outer surface 49. More specifically, in the embodiment depicted, the base portion 34 defines four large holes 50A, 50B, 50C, 50D that extend through the base portion 34 and eight small holes 54A-H that extend through the base portion 34. Each of the holes 50A-D has a respective centerline 56.

The cylindrical inner surface 42 includes a first segment 58 having a first diameter and a second segment 62 having a second diameter that is larger that the first diameter, thereby forming a radially-extending lip 66 adjacent the upper end of the sidewall portion 38 opposite the base portion 34. The second segment 62 of the inner surface 42 defines an opening 68 to the chamber 46.

Figure 4:
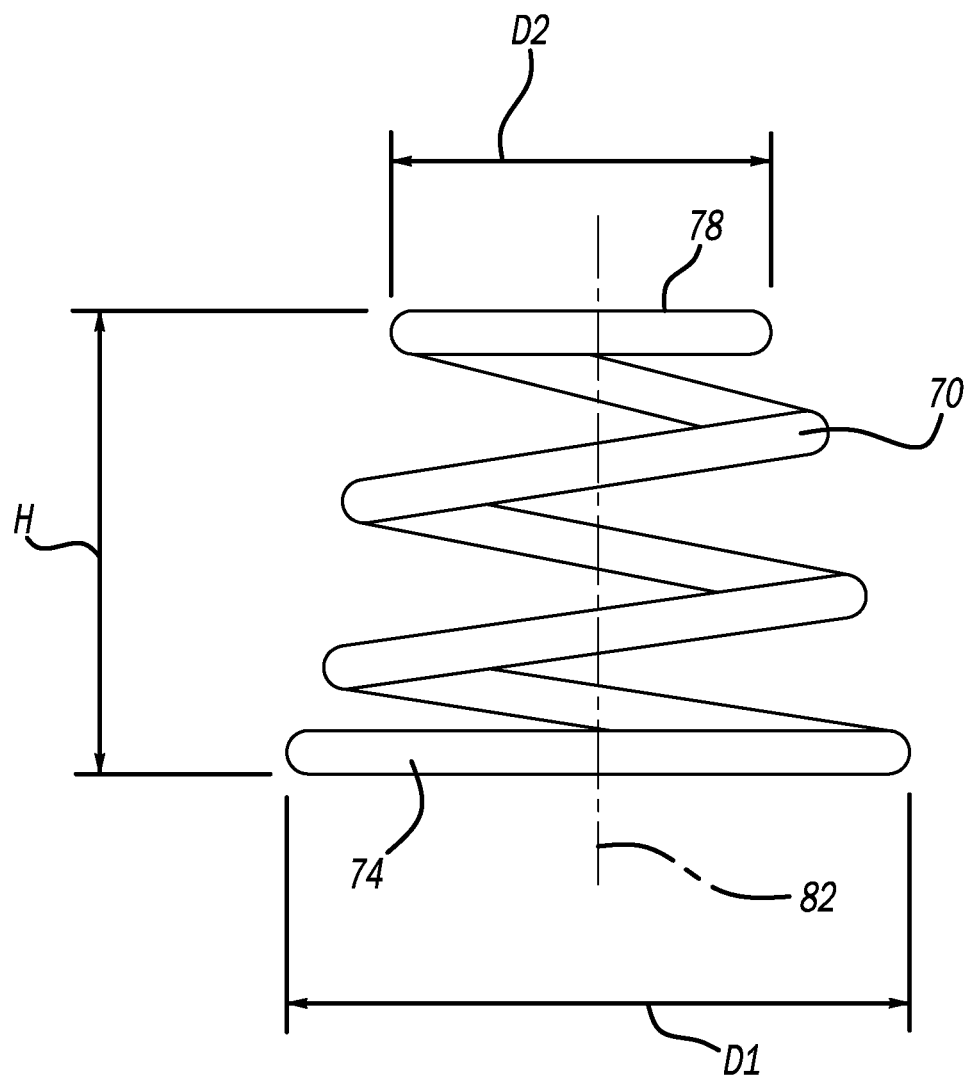
FIG. 4 is a schematic, side view of one of the springs.

Referring to FIG. 4, a spring 70 is schematically depicted. The spring in the embodiment depicted is a coil spring, and more specifically the spring 70 is a conical or tapered coil spring having a wide base 74 and a narrower top 78. The spring is coiled or spiraled about a centerline 82. Those skilled in the art will recognize materials suitable for use as a coil spring, including various metals and metal alloys. In one embodiment, the spring 70 has a base diameter D1 of 11 millimeters, a top diameter D2 of 5.5 millimeters, and a height H of 11 millimeters. It should be noted that other suitable spring configurations may be employed within the scope of the claimed invention.

Figure 5:
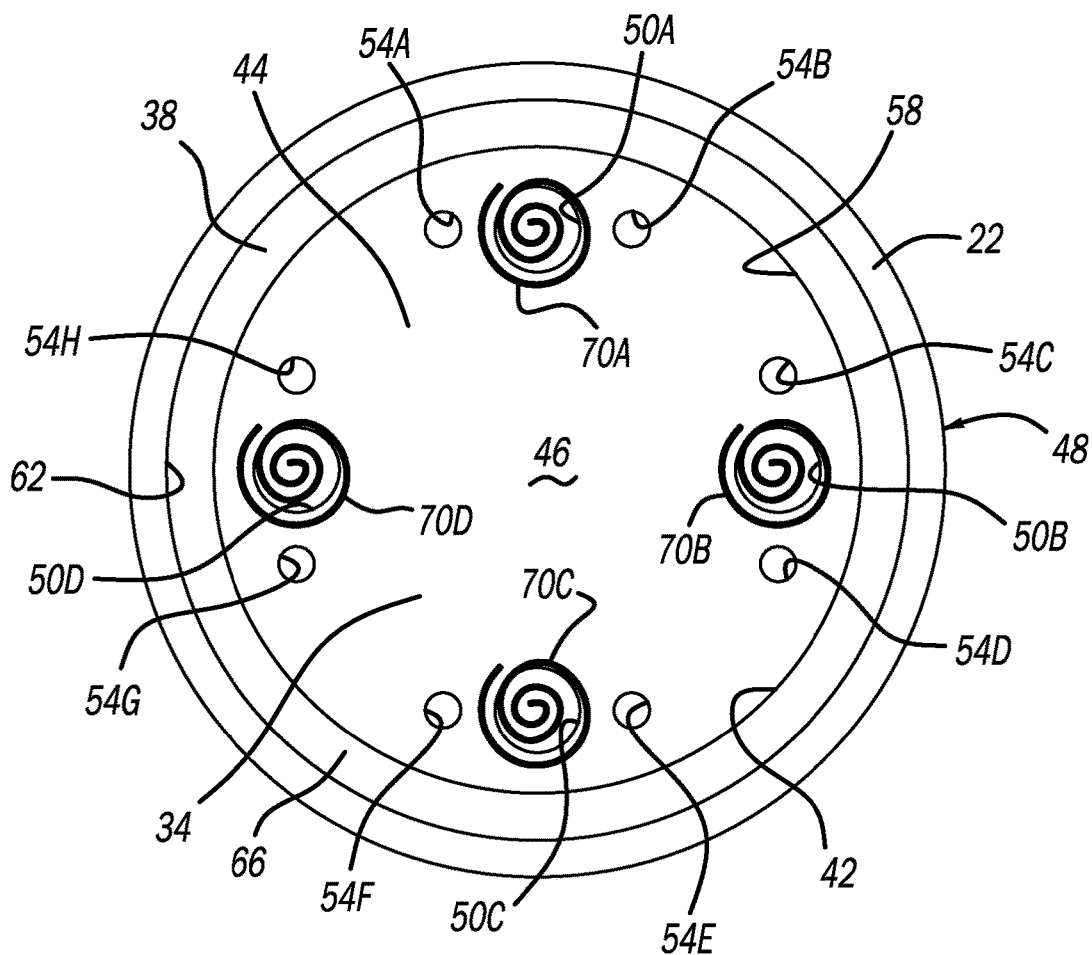
FIG. 5 is a schematic, top view of the pot with the springs attached thereto.

FIG. 5, wherein like reference numbers refer to like components from FIGS. 1-4, schematically depicts the pot 22 with a plurality of springs 70A-D mounted to the surface 44 of the base portion 34. Referring to FIG. 5, each of the springs 70A, 70C, 70D is substantially identical to the spring shown at 70 in FIG. 4, and thus spring 70 is representative of springs 70A, 70B, 70C, 70D.

Figure 6:
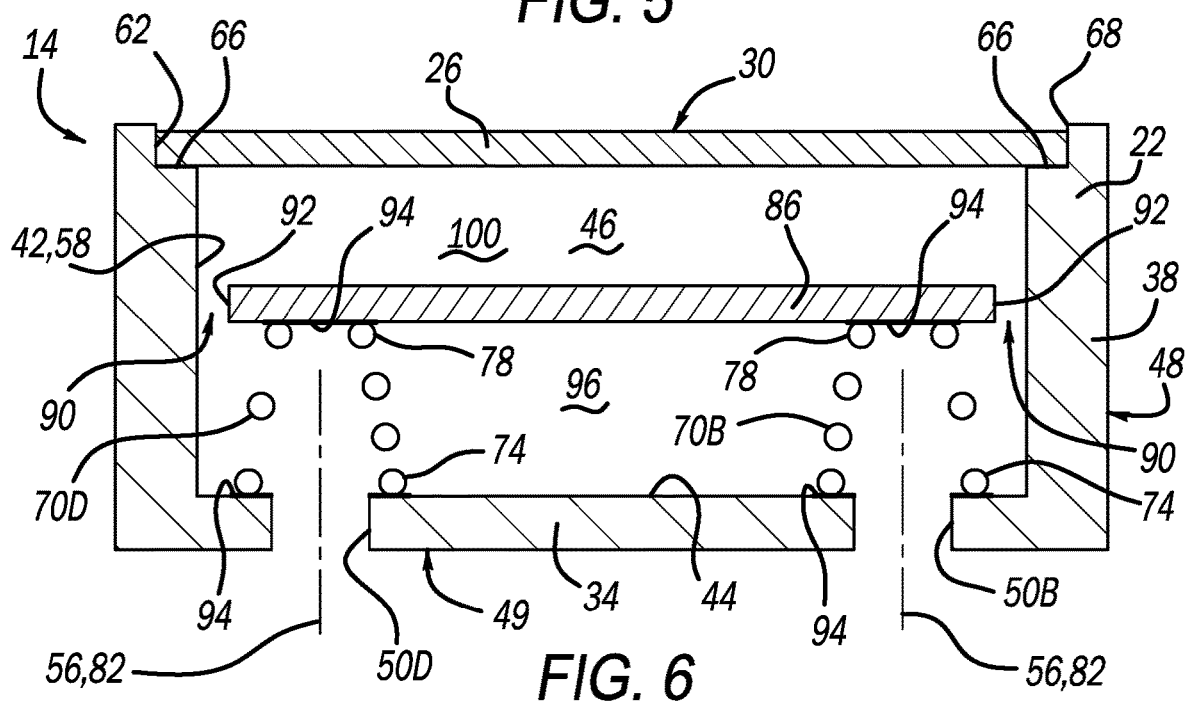
FIG. 6 is a schematic, cross-sectional side view of the pot call with the sound board mounted to the pot via the springs.
Figure 7:
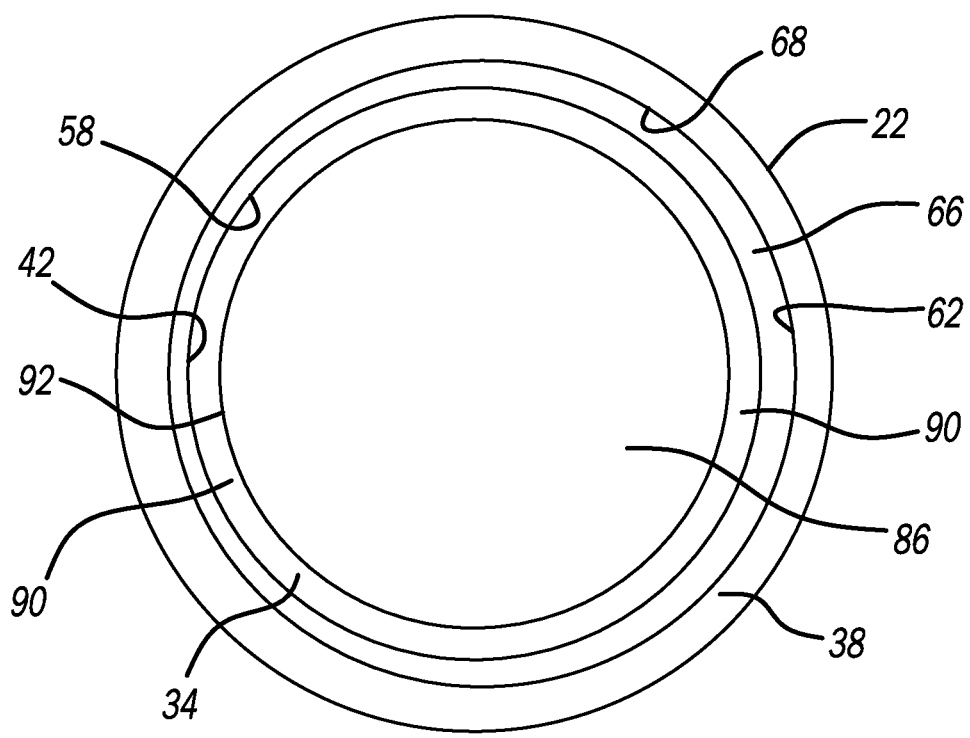
FIG. 7 is a schematic, top view of the pot with the sound board mounted thereto.

FIG. 6, wherein like reference numbers refer to like components from FIGS. 1-5, schematically depicts the fully-assembled pot call 22. Referring to FIG. 6, the pot call 14 further includes a sound board 86. In the embodiment depicted, the sound board 86 is generally disk-shaped, i.e., a cylinder wherein the diameter is substantially greater than the height. The sound board 86 is disposed within the chamber 46. The diameter of the sound board 86 is smaller than the diameter of the first segment 58 of the inner surface 42, and thus a gap 90 exists between the peripheral edge 92 of the sound board 86 and the inner surface 42, 58 such that there is no direct contact between the sound board 86 and the pot 22, as shown in FIGS. 6 and 7. The sound board 86 is substantially parallel to the inner surface 44 of the base portion 34.

Each spring 70A, 70B, 70C, 70D is mounted to the surface 44 of the base portion 34, such as via an adhesive 94, and each spring 70A, 70B, 70C, 70D is mounted to the sound board 86, such as via adhesive 94. More particularly, in the embodiment depicted, the base 74 of each spring 70A, 70B, 70C, 70D is adhered to the surface 44, and the top 78 of each spring 70A, 70B, 70C, 70D is adhered to the sound board 86. It should be noted that, in the cross-sectional view of FIG. 6, only two of the springs 70B, 70D and holes 50B, 50D are shown; however, springs 70A and 70C are mounted to the sound board 86 and to the surface 44 relative to holes 50A, 50C in the same manner as shown with respect to springs 70B, 70D.

Furthermore, in the embodiment depicted, each spring 70A, 70B, 70C, is mounted over, and aligned with, a respective one of the large holes 50A, 50B, 50D such that the centerline 56 of each of the large holes 50A, 50B, 50C, 50D extends through a respective one of the springs 70A, 70B, 70C, 70D and, likewise, the centerline 82 of each spring 70A, 70B, 70C, 70D extends through a respective one of the holes 50A, 50B, 50C, 50D. The centerlines 82 of the springs 70A-D are substantially parallel to the centerlines 56 of the holes 50A-D.

Thus, spring 70A is aligned with hole 50A such that the centerline 82 of spring 70A extends through hole 50A, and the centerline 56 of hole 50A extends through the spring 70A. Spring 70B is aligned with hole 50B such that the centerline 82 of spring extends through hole 50B, and the centerline 56 of hole 50B extends through the spring 70B. Spring 70C is aligned with hole 50C such that the centerline 82 of spring extends through hole 50C, and the centerline 56 of hole 50C extends through the spring 70C. Spring 70D is aligned with hole 50D such that the centerline 82 of spring extends through hole 50D, and the centerline 56 of hole 50D extends through the spring 70D.

Figure 8:
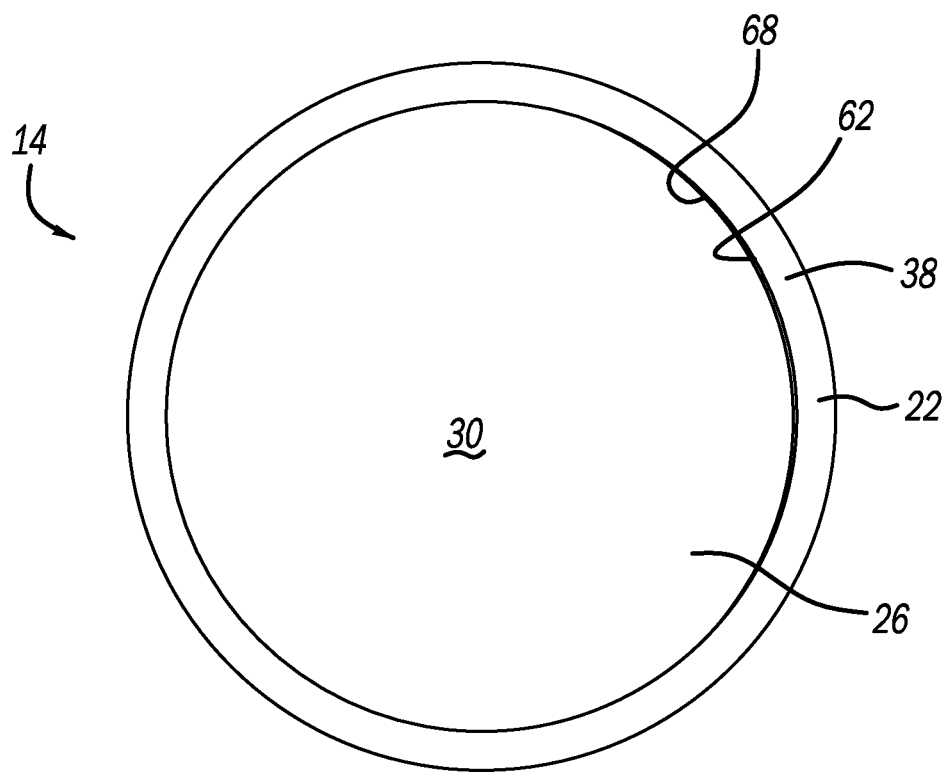
FIG. 8 is a schematic, top view of the assembled pot call.

The centerlines 56 of each hole 50A-D may be coextensive with the corresponding spring's centerline 82. As shown in FIG. 6, the diameter D1 of the base 74 of each spring 70A-70D is greater than the diameters of the holes 50A-50D. Accordingly, the base 74 of each spring 70A-70D surrounds a respective one of the holes As shown in FIGS. 6 and 8, the member 26 that defines the striking surface 30 is, in the embodiment depicted, also disk-shaped. The diameter of the member 26 is larger than the diameter of the first segment 58 of the inner surface 42, but is less than the diameter of the second segment 62 of the inner surface 42. Accordingly, as shown in FIGS. 1, 6, and 8, the member 26 is insertable into the chamber 46 at the opening 68, but physical part interference between the lip 66 and the member 26 prevents the member 26 from extending significantly beyond the opening 68. Interaction between the member 26 and the segment 62 prevents radial movement of the member 26 relative to the pot 22. Adhesive bonding, clips, etc. may be employed to maintain the member 26 in contact with the lip 66. Thus, the member 26 covers and obstructs the opening 68 to the chamber 46.

It should be noted that, as best shown in FIG. 6, the springs 70A-D are configured such that the sound board 86 does not contact the member 26 or any portion of the pot 22, including base portion 34 and sidewall portion 38 during normal operation, i.e., when gravity is the only external force acting on the sound board 86. More specifically, the springs 70A-70D are dimensioned, and have spring constants, such that the springs 70A-70D support the sound board 86 within the chamber 46 such that a gap 96 is maintained between the surface 44 of the base portion 34 and the sound board 86, a gap 100 is maintained between the sound board 86 and the member 26, and gap 90 is maintained when gravity is the only external force acting on the sound board 86.

Furthermore, in the embodiment depicted, forces are transmissible from the pot 22 to the sound board 86 solely via the springs 70A-70D; and no supports, other than the springs are used to connect the sound board 86 to the pot 22

It should be further noted that the placement and configurations of springs shown in merely exemplary, and that other spring arrangements may be employed within the scope of the claimed invention to support the sound board 86 within the chamber 46. For example, and without limitation, springs may connect the sound board 86 to the inner surface 42, springs may attach to the peripheral edge 92 of the sound board 86, etc., within the scope of the claimed invention.

The pot call system 10 is used by rubbing the striker 18 against the striking surface 30 in a manner that is understood by those skilled in the art. The use of springs 70A-D to mount the sound board 86 as described herein increases sound quality and resonance, which results in the call system 10 producing a more realistic simulation of turkey vocalizations. Furthermore, by using springs instead of a pedestal to support the sound board, more air volume is present in the chamber 46, which further assists in producing realistic simulations of turkey vocalizations.

Those skilled in the art will recognize appropriate materials to construct the various components of the pot call system within the scope of the claimed invention. For example, and without limitation, the pot 22 may comprise wood, polymers, acrylic, etc. within the scope of the claimed invention; the member 26 forming striking surface 30 may comprise of glass, slate, copper, etc. within the scope of the claimed invention; and the sound board 86 may comprise glass, slate, various woods, etc. within the scope of the claimed invention.

While the best modes for carrying out the disclosure have been described in detail, those familiar with the art to which this disclosure relates will recognize various alternative designs and embodiments for practicing the disclosure within the scope of the appended claims.

The invention claimed is:

1. A turkey call comprising:
a pot defining a chamber and an opening to the chamber;
a sound board;
at least one spring interconnecting the sound board and the pot within the chamber; and
a member defining a striking surface closing at least a portion of the opening to the chamber.

2. The turkey call of claim 1, wherein the sound board is connected to the pot solely via said at least one spring.

3. The turkey call of claim 2, wherein the pot includes a base portion and a sidewall portion;
wherein the base portion and the sidewall portion cooperate to define the chamber.

4. The turkey call of claim 3, wherein the chamber is cylindrical and the opening is circular;
wherein the sound board is disk-shaped; and
wherein the sound board and the sidewall portion define an annular gap therebetween.

5. The turkey call of claim 1, wherein the pot defines a plurality of sound holes extending from the chamber to the exterior of the pot;
wherein said at least one spring includes a plurality of springs;

wherein each of the springs has a respective centerline; and wherein each of the centerlines extends through a respective one of the sound holes.

6. The turkey call of claim 1, wherein the springs are coil springs.

7. The turkey call of claim 6, wherein the springs are tapered or conical.

8. The turkey call of claim 1, wherein the sound board is not in contact with the pot and the member.

9. A method comprising:
   possessing a turkey call apparatus having a pot defining a chamber and an opening to the chamber, a sound board within the chamber, at least one spring interconnecting the sound board and the pot within the chamber, and a member defining a striking surface closing at least a portion of the opening to the chamber; and
   rubbing a striker on the striking surface to simulate the call of a turkey.

\* \* \* \* \*